(12) United States Patent
Luo et al.

(10) Patent No.: US 8,062,398 B2
(45) Date of Patent: Nov. 22, 2011

(54) VACUUM CLEANER AND CYCLONE MODULE THEREFOR

(75) Inventors: Ming Luo, Shenzhen (CN); Wing-Hei Cho, Kwun Tong (CN)

(73) Assignee: BISSELL Homecare, Inc., Grand Rapids, MI (US)

( * ) Notice: Subject to any disclaimer, the term of this patent is extended or adjusted under 35 U.S.C. 154(b) by 219 days.

(21) Appl. No.: 12/339,116

(22) Filed: Dec. 19, 2008

(65) Prior Publication Data

US 2010/0154367 A1    Jun. 24, 2010

(51) Int. Cl.
*B01D 50/00* (2006.01)
(52) U.S. Cl. ............ 55/337; 55/456; 55/424; 55/428; 55/429; 55/DIG. 3; 15/352; 15/353; 15/347
(58) Field of Classification Search ............ 55/337, 55/456, 424, 428, 429, DIG. 3; 15/352, 353, 15/347
See application file for complete search history.

(56) References Cited

U.S. PATENT DOCUMENTS

| | | | |
|---|---|---|---|
| 4,738,697 A | 4/1988 | Westergren | |
| 7,305,735 B2* | 12/2007 | Overvaag | 15/352 |
| 7,341,611 B2* | 3/2008 | Greene et al. | 55/337 |
| 7,381,234 B2* | 6/2008 | Oh | 55/318 |
| 7,381,236 B2 | 6/2008 | Lee et al. | |
| 7,419,521 B2* | 9/2008 | Oh et al. | 55/337 |
| 7,445,655 B2 | 11/2008 | Bock et al. | |
| 7,547,351 B2* | 6/2009 | Oh et al. | 95/271 |
| 7,556,662 B2* | 7/2009 | Lee et al. | 55/345 |
| 7,628,833 B2* | 12/2009 | Oh | 55/345 |
| 7,637,973 B2* | 12/2009 | Oh et al. | 55/337 |
| 7,662,202 B2* | 2/2010 | Oh et al. | 55/459.1 |
| 2002/0194993 A1* | 12/2002 | Gen | 95/268 |
| 2004/0237482 A1* | 12/2004 | Lim et al. | 55/337 |
| 2005/0160554 A1* | 7/2005 | Ueyama et al. | 15/353 |
| 2006/0130441 A1 | 6/2006 | Oh | |
| 2006/0156699 A1* | 7/2006 | Kim | 55/345 |
| 2006/0168923 A1* | 8/2006 | Lee et al. | 55/345 |
| 2006/0272299 A1* | 12/2006 | Choi | 55/337 |
| 2006/0277874 A1* | 12/2006 | Yoo | 55/429 |
| 2007/0012002 A1* | 1/2007 | Oh et al. | 55/428 |
| 2007/0050939 A1* | 3/2007 | Dant et al. | 15/347 |
| 2007/0079585 A1 | 4/2007 | Oh et al. | |
| 2007/0079590 A1* | 4/2007 | Yoo | 55/429 |
| 2007/0084160 A1 | 4/2007 | Kim | |
| 2007/0209337 A1* | 9/2007 | Conrad | 55/337 |
| 2007/0289266 A1* | 12/2007 | Oh | 55/337 |
| 2008/0047091 A1* | 2/2008 | Nguyen | 15/300.1 |
| 2008/0256911 A1* | 10/2008 | Oh et al. | 55/346 |
| 2008/0264015 A1* | 10/2008 | Oh et al. | 55/429 |
| 2008/0282497 A1* | 11/2008 | Griffith et al. | 15/352 |
| 2009/0056060 A1* | 3/2009 | Han et al. | 15/349 |
| 2009/0064643 A1* | 3/2009 | Sepke et al. | 55/336 |

FOREIGN PATENT DOCUMENTS

DE    10021594 A1    11/2001
(Continued)

*Primary Examiner* — Jason M Greene
*Assistant Examiner* — Dung Bui
(74) *Attorney, Agent, or Firm* — McGarry Bair PC (57) ABSTRACT

A vacuum cleaner with a cyclone module assembly comprising a separation chamber for separating dust and debris from air, a dirt collection chamber for collecting dust and debris that is separated from the air in the cyclone separation chamber, wherein the separation chamber further includes an exhaust grill that is removable for cleaning.

15 Claims, 8 Drawing Sheets

FOREIGN PATENT DOCUMENTS

| | | | |
|---|---|---|---|
| EP | 1743558 | A2 | 1/2007 |
| EP | 1774890 | A1 | 4/2007 |
| EP | 1985215 | A2 | 10/2008 |
| EP | 1989984 | A2 | 11/2008 |
| GB | 2428210 | A | 1/2007 |
| WO | 2004093631 | A1 | 11/2004 |

* cited by examiner

VACUUM CLEANER AND CYCLONE MODULE THEREFOR

BACKGROUND OF THE INVENTION

1. Field of the Invention

The invention relates to vacuum cleaners and in particular to vacuum cleaners having cyclonic dirt separation. In one of its aspects, the invention relates to a cyclone separator with an improved exhaust grill.

2. Description of the Related Art

Vacuum cleaners employing cyclone separators are well known. Some cyclone separators follow textbook examples using frusto-conical shape separators and others use high-speed rotational motion of the air/dirt to separate the dirt by centrifugal force. Typically, the cyclonic separation chamber is positioned above the dirt collection chamber in a vertically stacked orientation. Working air enters and exits at an upper portion of the cyclone separator and debris is collected in lower portion. Alternatively, the cyclone separator and dirt collection chamber can be oriented horizontally within the cyclone module. This orientation can reduce the overall height of the cyclone module, which is particularly desirable for canister vacuum cleaners to lower the center of gravity and improve stability of the unit as it rolls along the floor.

BISSELL Homecare, Inc. has developed a dual function canister vacuum cleaner that can accommodate a standard vacuum filter bag or an interchangeable bagless cyclone module. The cyclone module is configured so the cyclone separation chamber is positioned adjacent to the dirt receptacle along a horizontal plane. The air flowing through the cyclone separator passes through an exhaust grill before exiting the cyclone module through a filter assembly on the bottom of the module. The exhaust grill is configured to be easily removable by a user for cleaning.

U.S. Pat. No. 7,381,236 to Lee discloses a cyclone module with a cyclone separation chamber and a cyclone dust collection chamber arranged in parallel where the dust collector has a backflow prevention member disposed at one sidewall of the dust chamber to prevent collected dust from flowing back into the cyclone chamber.

U.S. Patent Application Publication No. 2006/0130441 to Oh discloses an exhaust grill for a cyclone separator wherein the air passages in the grill have a leading surface facing toward the direction of air flow around the grill. It is said that the direct flow of air into the grill prevents stagnant vortices from forming in the grill air passages, thus preventing debris build-up.

U.S. Pat. No. 7,445,655 to Bock discloses a canister vacuum cleaner that can accommodate a filter bag or a dust collection container having a clip to hold a bag closure plate. A pivoting carrier in the dust compartment includes locking members which overlap an edge of the dust compartment so that the vacuum cleaner lid cannot be closed when either the filter bag or dust collector is absent.

SUMMARY OF THE INVENTION

According to the invention, a vacuum cleaner comprises a cleaner body having a suction cavity with an inlet port and an outlet port that is adapted to receive a removable cyclone module. The cyclone module includes a separation chamber with an inlet opening positioned at a lower portion thereof and adapted to communicate with the inlet port and a cyclone outlet opening adapted to communicate with the outlet port. An exhaust grill is mounted in the separation chamber in fluid communication with the cyclone outlet. A ramp adjacent to the separator inlet opening is adapted to direct dirty air entering through the inlet in an upward helical path along the separation chamber for separating dust or debris from air. A debris outlet at an upper portion of the separation chamber guides debris into a dust collection chamber that is adjacent the separation chamber and in communication with the debris outlet for collecting debris and dust separated from air in the separation chamber. A vacuum fan/motor mounted in the cleaner body has a suction inlet in communication with the inlet port and adapted to maintain a flow of dirty air from the inlet port through the cyclone separation chamber between the inlet opening and the cyclone outlet.

In one embodiment the exhaust grill is adapted to be removable from the separation chamber above the cyclone outlet, which is formed at a lower portion of the separation chamber. The cyclone module further includes a filter assembly in fluid communication with the cyclone outlet and removably mounted to the separation chamber.

In accordance with another embodiment of the invention, cyclone module for use in a vacuum cleaner comprises a separation chamber having inlet opening at a lower portion thereof and is adapted to communicate with the inlet port, and further has a cyclone outlet opening formed at a lower portion of the separation chamber that is adapted to communicate with the outlet port. An exhaust grill is mounted in the separation chamber and in fluid communication with the cyclone outlet. A ramp is positioned adjacent the inlet opening and adapted to direct dirty air entering the inlet opening in an upward helical path along the separation chamber for separating dust or debris from air. A debris outlet is positioned at an upper portion of the separation chamber and a dust collection chamber is positioned adjacent the separation chamber and is in communication with the debris outlet for collecting debris and dust separated from air in the separation chamber.

In one embodiment, the exhaust grill is removably mounted in the separation chamber above the cyclone outlet. In another embodiment, a filter assembly is fluidly connected to the cyclone outlet. Further, the filter assembly is removably mounted to the separation chamber.

DESCRIPTION OF THE PREFERRED EMBODIMENT

Figure 1:
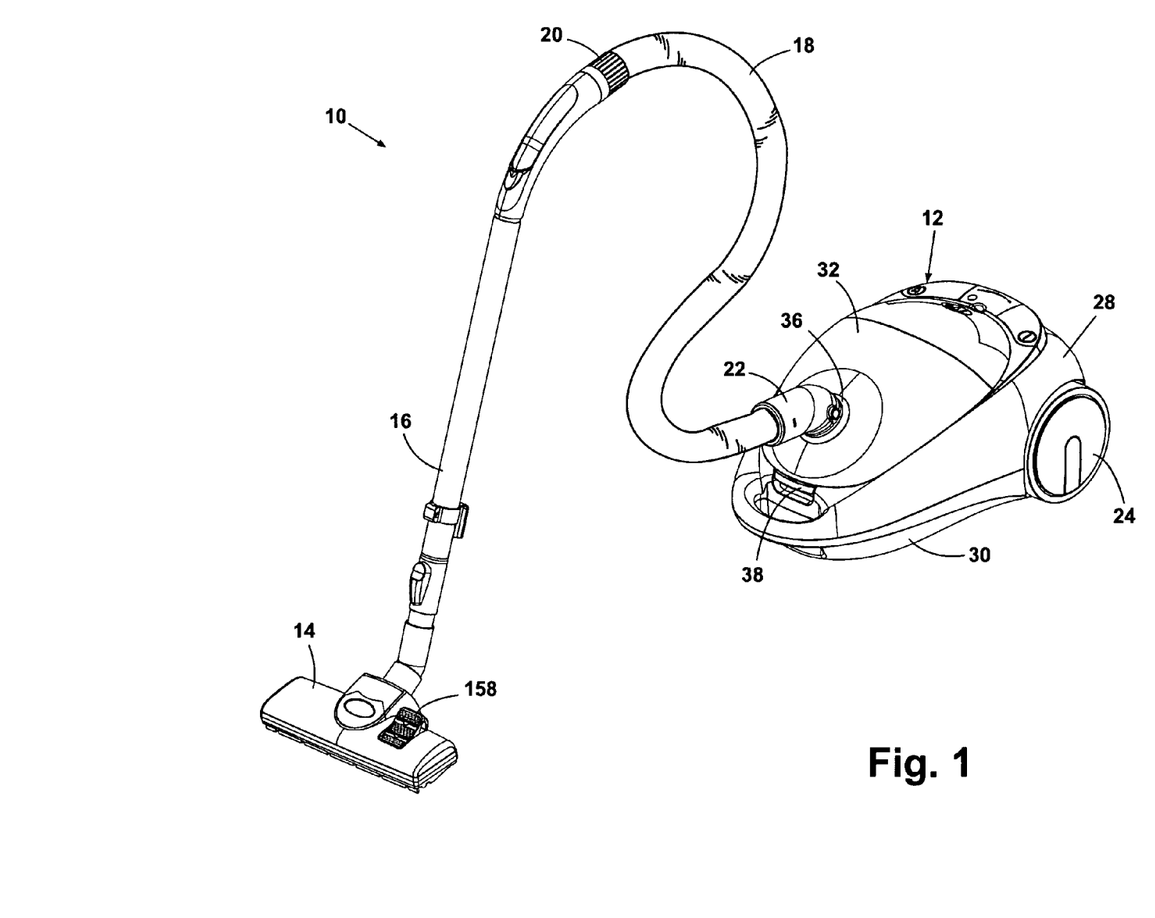
FIG. 1 is a perspective view of a canister vacuum cleaner with a cyclone module assembly according to the invention.
Figure 2:
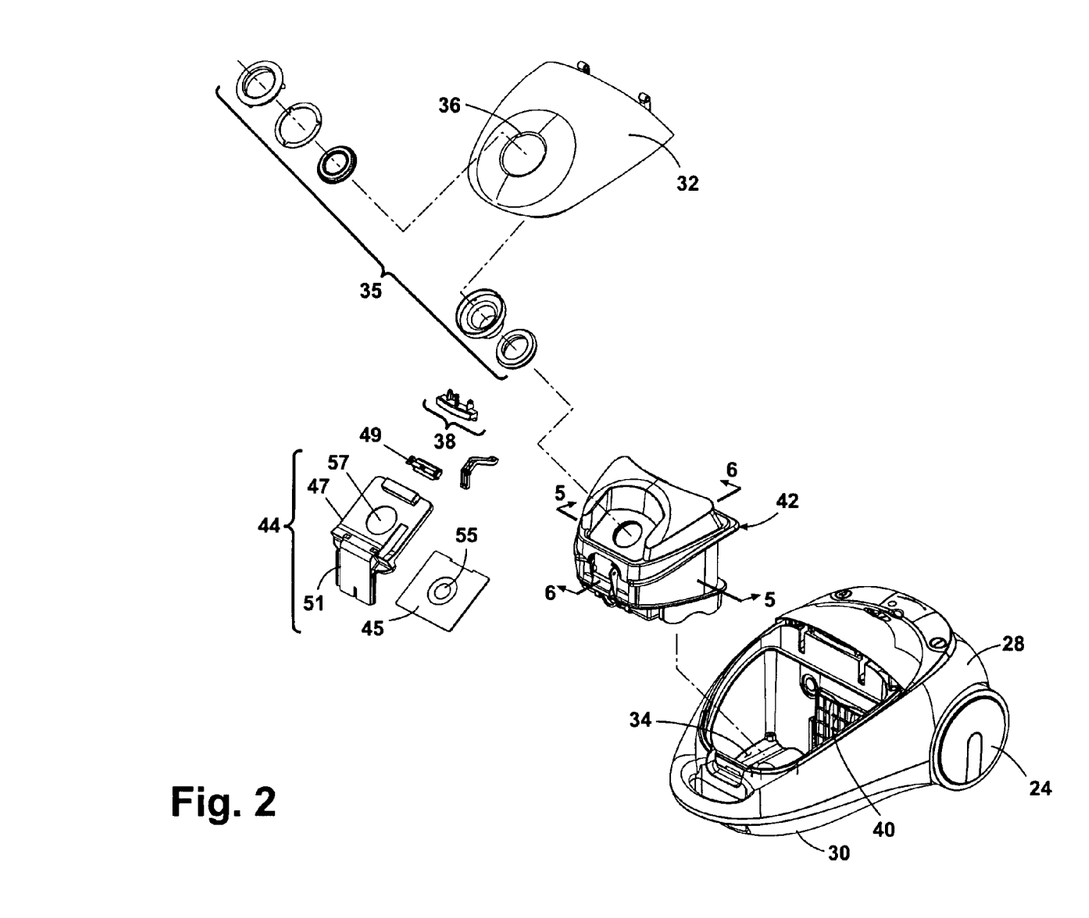
FIG. 2 is a partial exploded right quarter perspective view of the canister vacuum cleaner of FIG. 1.

Referring to the drawings, and particularly to FIGS. 1 and 2, a canister vacuum cleaner 10 according to the invention comprises a cleaner body 12, a cleaning head 14 for drawing dust and debris from a surface to be cleaned, an extension wand assembly 16, and a flexible hose 18 having inlet and outlet connectors 20, 22 that attach to the cleaner body 12 and the wand assembly 16. A pair of rear wheels 24 is mounted to a rearward portion of the cleaner body 12 and a smaller swiveling wheel 26 is attached to the forward portion for movement across a surface to be cleaned. A motor cavity is formed within the cleaner body 12 between an upper housing 28 and a lower housing 30 for containing a conventional vacuum fan/motor assembly (not shown) oriented transversely therein. As shown in FIG. 2, a pivotally mounted cover 32 is connected to the upper housing 28 and configured to selectively enclose a suction cavity 34 formed therein. An inlet port 36 on the cover 32 comprises a seal assembly 35 to sealingly receive the hose outlet connector 22 thereby fluidly connecting the hose 18 to the suction cavity 34 when the cover 32 is sealed to the upper housing 28. A pivoting latch assembly 38 is mounted to a forward portion of the cover 32 and selectively secures it to the upper housing 28 thereby enclosing the suction cavity 34. An access grill 40 is provided on the back wall of the suction cavity 34 to provide an air path to the suction source (not shown). The suction cavity 34 receives a removable cyclone module 42 that is configured to centrifugally separate dust from a working airstream. When the suction cavity 34 is enclosed by the cover 32, the cyclone module 42 contained therein becomes fluidly connected to the suction source (not shown) on the outlet side and to the flexible hose 18 on the inlet side thereby creating a working air path from the cleaning head 14 through the extension wand 16, hose 18, seal assembly 35, cyclone module 42, and suction motor assembly (not shown). In an alternate configuration, a filter bag assembly 44 can replace the interchangeable cyclone module 42 within the suction cavity 34 of the cleaner body 12. The filter bag assembly 44 comprises a commonly known filter bag 45 secured to a bag mounting plate 47 by a resilient clip 49. The mounting plate comprises a lower portion for mounting the assembly within the suction cavity 34 that comprises U-shaped edges 51. The U-shaped edges 51 are slidably received in L-shaped mounting channels 53 formed on the front wall of the suction cavity 34. A resilient clip 49 is pivotally mounted in a recess formed at the top of the bag mounting plate 47. The clip 49 secures the filter bag 45 to the mounting plate such that the bag inlet aperture 55 aligns with the mounting plate aperture 57, which is co-axial with inlet port 36 on the cleaner body cover 32 for fluid communication therebetween upon engagement.

Figure 3:
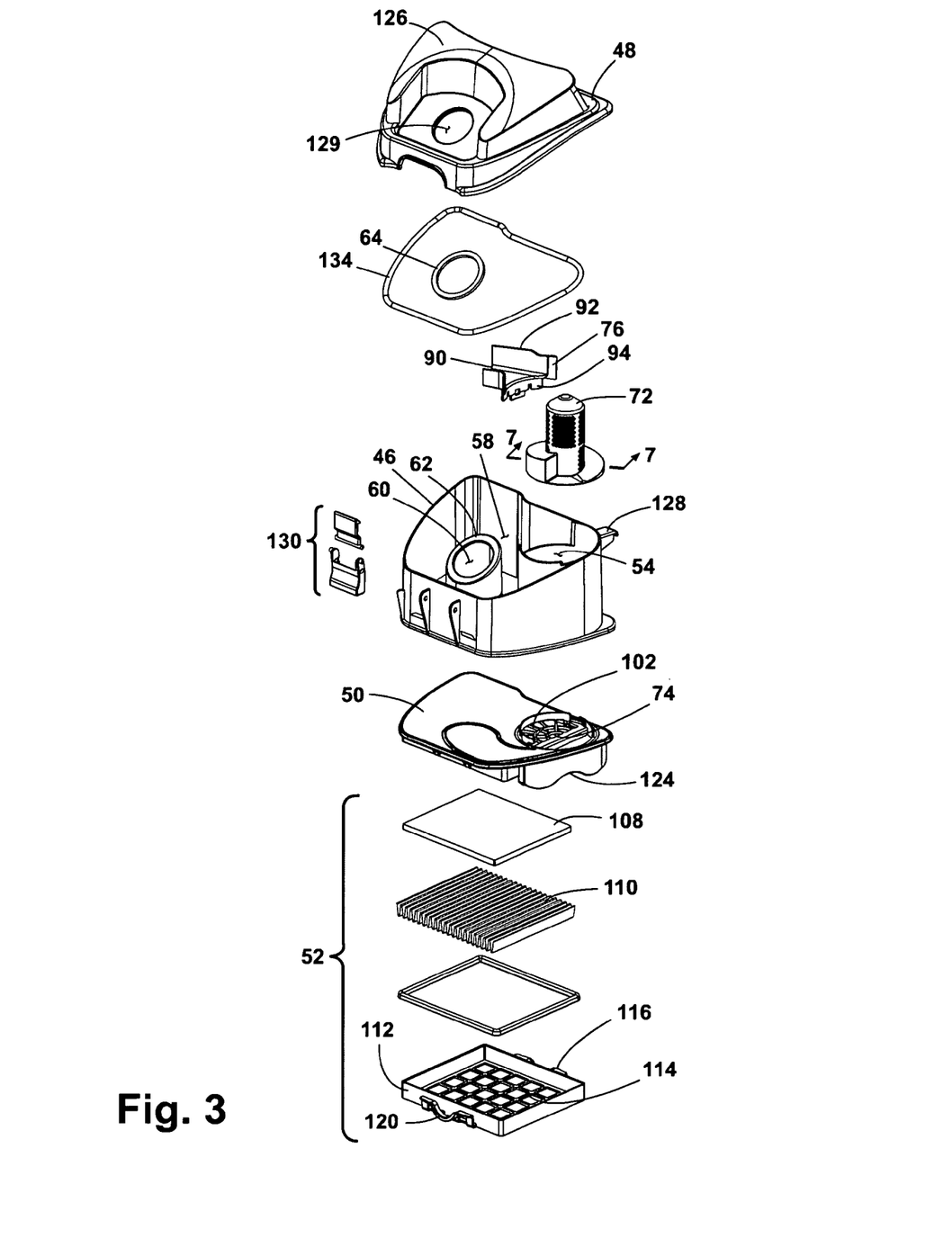
FIG. 3 is an exploded right quarter perspective view of the cyclone module of FIG. 2.

Referring to FIG. 3, the cyclone module 42 comprises a cyclone body 46 with an open top that is covered by a removable cyclone lid 48 and a partially open bottom that is covered by a cyclone base 50. The cyclone base 50 is adapted to receive a removable filter assembly 52 on the bottom side. The cyclone body 46 further comprises a separation chamber 54 defined by cylindrical wall 56 that depends from the bottom wall and is positioned at a rear corner of the cyclone body 46. The cylindrical wall 56 divides the interior portion of the cyclone body into a separation chamber 54 and a dust collection chamber 58. A working air inlet pipe 60 protrudes from the bottom wall and terminates in a flat face 62 that supports a compressible seal 64 for connection to the underside of the pivotally mounted cyclone lid 48. An inlet conduit 66 (FIGS. 4-5) running along the bottom of the cyclone body 46 adjacent to the outer wall connects the working air inlet pipe 60 to the base of the separator wall 56 thus forming an air path therebetween.

Figure 4:
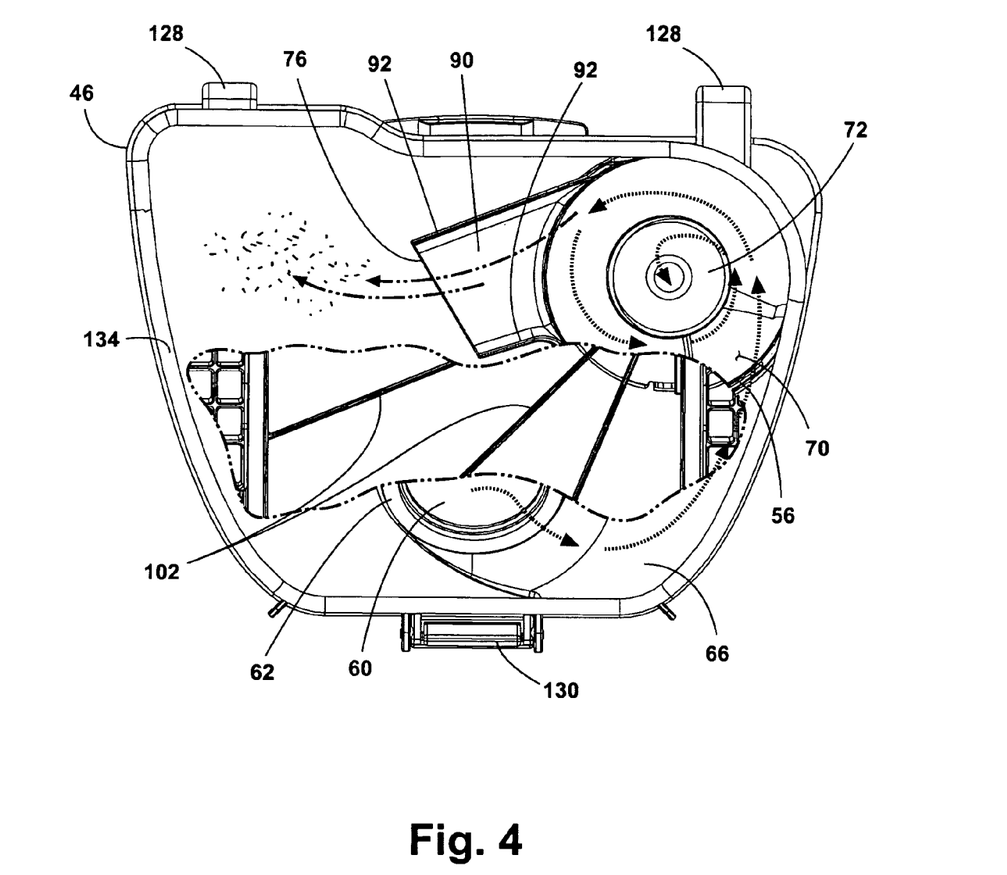
FIG. 4 is a top view of the cyclone module assembly with the lid removed.
Figure 5:
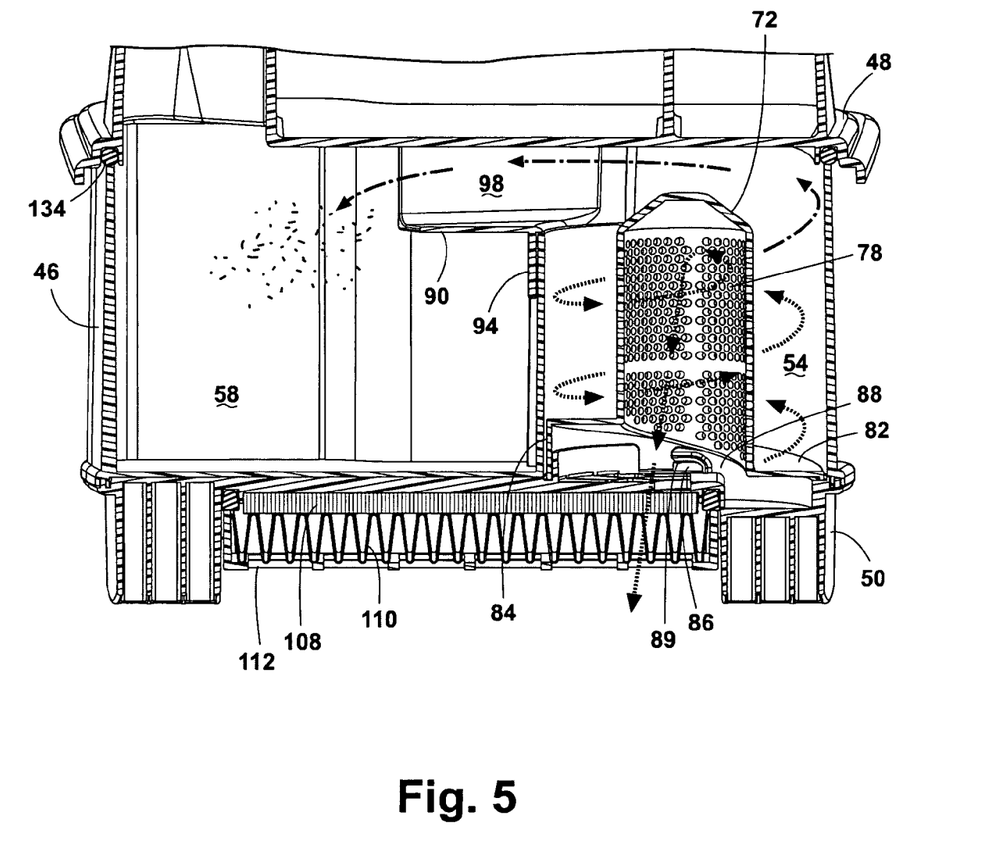
FIG. 5 is a cross-sectional view of the cyclone module taken through line 5-5 of FIG. 2.
Figure 6:
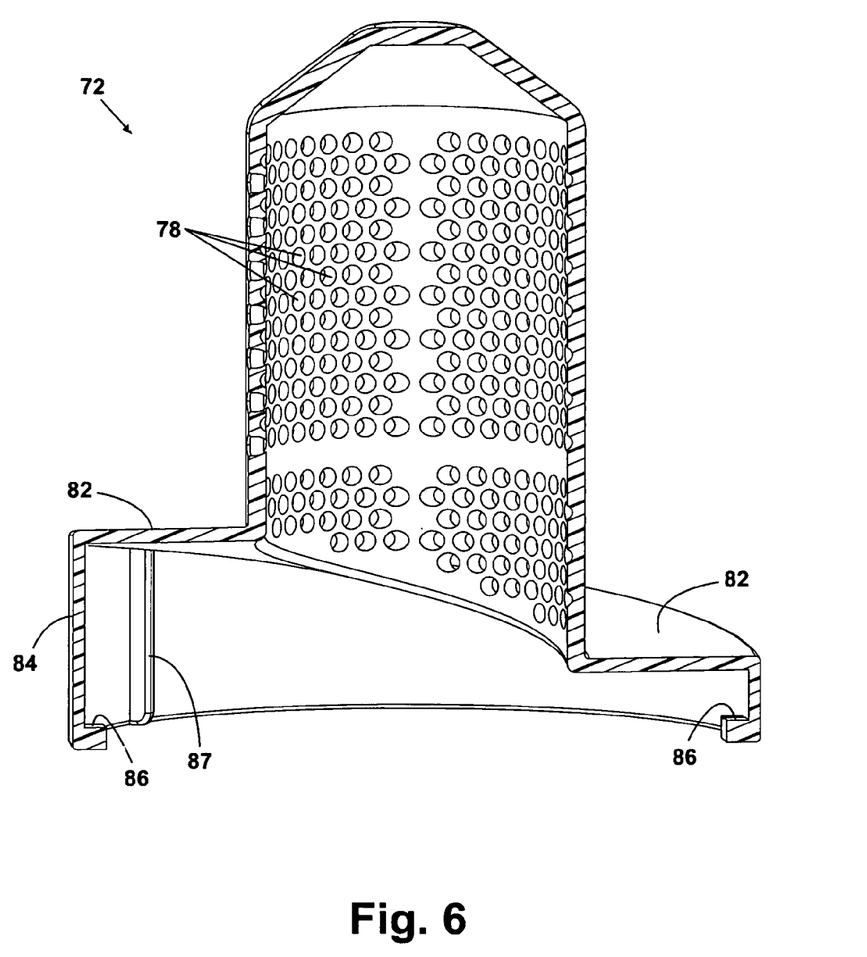
FIG. 6 is a cross-sectional view of the cyclone module taken through line 6-6 of FIG. 3.
Figure 7:
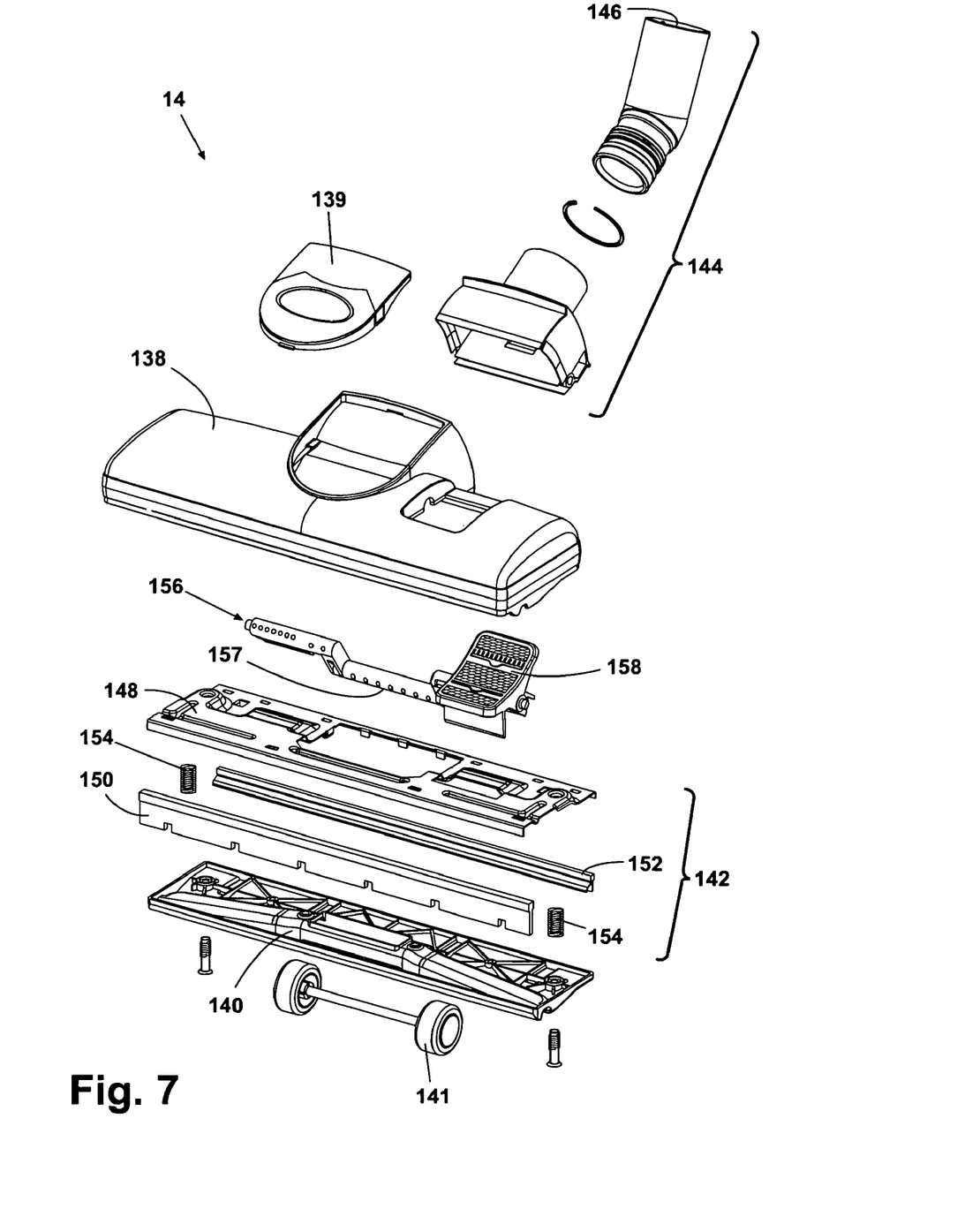
FIG. 7 is an exploded right quarter perspective view of the cleaning head shown in FIG. 1.

Referring now to FIGS. 3-7, the cyclone separator 68 comprises an inlet 70, an exhaust grill 72, a cyclone outlet 74, and a debris outlet 76. The rectangular-shaped inlet 70 is located at the base of the separator housing; adjacent to the sidewall and bottom wall of the cyclone body 46. Referring to FIGS. 5 and 6, the exhaust grill 72 comprises a cylindrical portion with a plurality of exhaust apertures 78 in fluid communication with the cyclone outlet 74. The grill 72 further comprises a ramped flange 82 extending outwardly from the lower cylindrical portion. The ramped flange follows a counterclockwise helical trajectory to guide the working airflow and entrained debris toward the debris outlet. The exhaust grill 72 further comprises a sleeve 84 extending downwardly from the perimeter of the ramped flange. Two locking tabs 86 extend inwardly from the sleeve 84 for selectively engaging corresponding mounting hooks 88 protruding from the cyclone base 50 on opposing sides of the cyclone outlet 74. Each hook 88 includes a detent 89 for retaining the exhaust grill tabs 86. An orientation rib 87 extends along the inside wall of the sleeve 84 from the bottom edge to the bottom of the flange 82. The orientation rib 87 insures proper orientation of the exhaust grill 72.

Referring now to FIGS. 3-5, the debris outlet 76 comprises a horizontal guide member 90 flanked by vertical side walls 92 and further comprises a snap tab 94 for retaining the debris outlet to a cutout 96 at the top of the separation chamber 54. The bottom surface of the cyclone lid 48 mates to the open top side of the debris outlet 76, thus forming a debris guide channel 98 that extends from the separation chamber 54 into the dust collection chamber 58. The debris outlet 76 is preferably positioned near the top of the cyclone body to maximize the vertical distance between the horizontal guide member 90 and the bottom wall of the cyclone body 46. This preferred orientation minimizes potential for debris re-entrainment and allows the cyclone lid to form the top surface of the debris guide channel 98 thereby reducing raw material and the potential quantity of components required.

The cyclone outlet 74 (FIG. 3) is covered by the removable exhaust grill 72 on the top side. The bottom side of the outlet communicates with a filter chamber 100 formed in the cyclone base 50. The outlet 74 comprises a substantially semi-circular aperture having a grill with ribs 102 that project radially outward from the center of the aperture to the perimeter of the filter chamber 100. The radial ribs 102 space the filter media away from the bottom surface of the cyclone base 50 and form flow channels 104 for guiding and distributing air across and through the filter surface.

Referring now to FIGS. 3 and 5, a removable filter assembly 52 comprises a first porous foam filter layer 108 backed by a second layer of pleated filter media 110 for capturing fine dust not separated within the cyclone body 46. The combination of filter media 108, 110 is mounted in a filter case 112 that can be selectively removed from the cyclone base 50 for cleaning or replacement. The filter case 112 comprises a tray structure with a grid frame 114 on the bottom side for supporting the filter media. Two projections 116 are formed on the back wall that engage mating slots 118 on the cyclone base 50. An integrally molded latch 120 on the front wall of the filter case 112 engages ramped projections 122 formed on the cyclone base 50 to retain the filter case 112 in a seated position. Arcuate supports 124 extend from the bottom surface of the cyclone base 50 on opposing sides thereof to vertically space the filter case 112 away from the bottom of the suction cavity 34 to prevent air flow blockage or restriction. It is contemplated that the filter media can include a wide array of materials including non-woven, HEPA, or any other suitable filter material.

The cyclone lid 48 is removably mounted to the top portion of the cyclone body 46. A handle 126 is formed at the top of the cyclone lid 48 for carrying the cyclone module 42 and for removing the cyclone lid 48 from the cyclone body 46 to empty debris or to clean the unit. Hooks 128 protrude from the back wall of the cyclone body 46 for pivotally retaining the cyclone lid 48. An over-center latch assembly 130 mounted to the front wall of the cyclone body 46 engages a lip 132 on the lid 48 to secure it to the body 46 and compress a rope seal 134 that is captured therebetween. The lid 48 further comprises an inlet aperture 129 for fluidly connecting the working air inlet pipe 60 to the inlet port 36 on the cleaner body cover 32.

Figure 8:
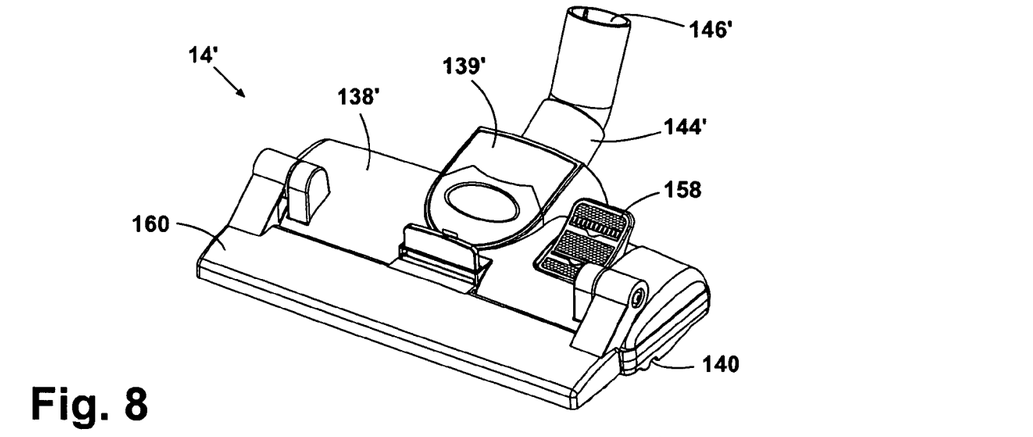
FIG. 8 is a right perspective view of an alternate cleaning head.
Figure 9:
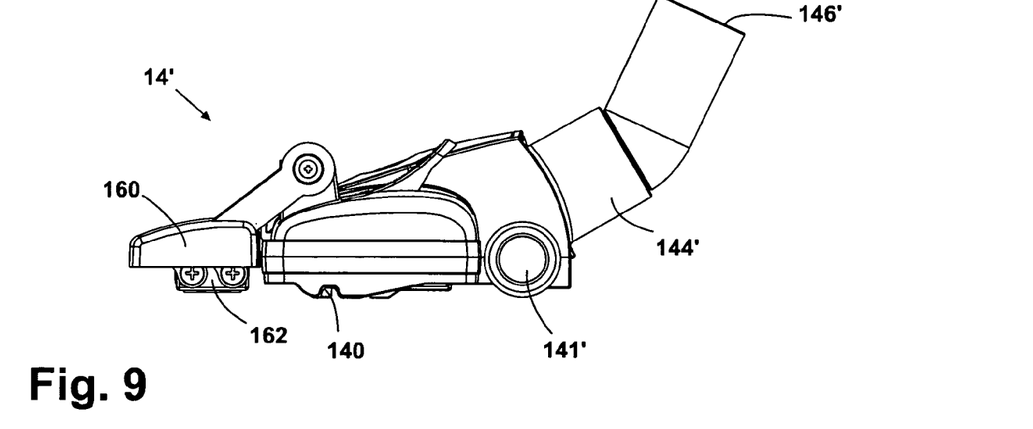
FIG. 9 is a side view of the cleaning head of FIG. 8, where the hair collection assembly is in a use position.
Figure 10:
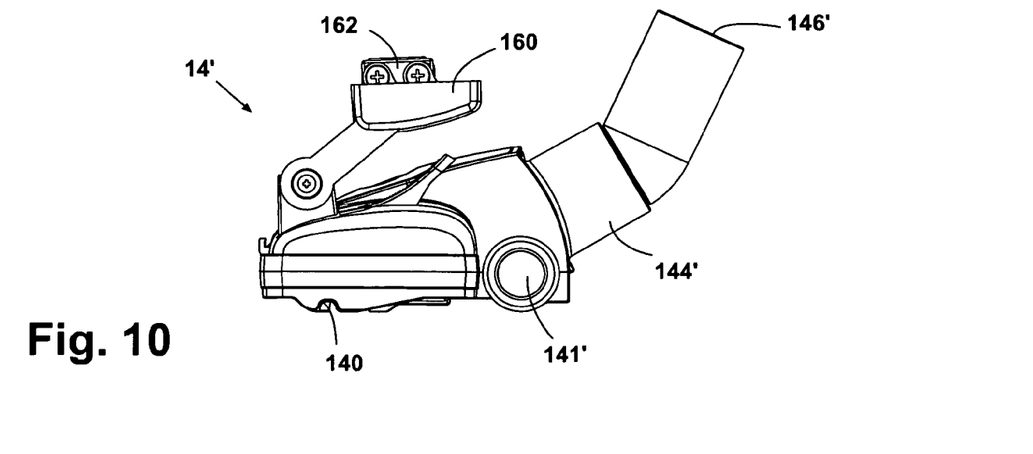
FIG. 10 is a side view of the cleaning head of FIG. 8, with the hair collection assembly is in a non-use position.

Referring now to FIGS. 7-10, the cleaning head 14 comprises a housing 138 that supports a nozzle 140, a brush assembly 142, and an articulating conduit 144 for drawing dust and debris from a surface to be cleaned. The nozzle 140 is fixed beneath the front portion of the housing 138 in fluid communication with the surface to be cleaned. An articulating conduit 144 provides an air path from the nozzle to the conduit outlet 146. The articulating conduit 144 has a first joint that pivots about a horizontal axis and a second joint that swivels 360 degrees. The conduit outlet 146 is sized to receive the extension wand assembly 16. The housing 138 further supports a decorative insert 139 that mounts within a recess formed on the top of the housing. Small wheels 141 are mounted to a rearward portion of the housing for movement across a surface to be cleaned. A retractable brush assembly 142 is resiliently mounted between the nozzle 140 and housing 138 for selective engagement with the cleaning surface. The brush assembly 142 comprises a brush plate 148 that secures a strip brush 150 on the leading edge and a squeegee 152 on the trailing edge. The brush plate 148 rests on compressible coil springs 154. The top surface of the brush plate 148 is operably connected to an offset cam rod 156 for engaging and retracting the brush plate 148. The offset cam rod 156 comprises a rotatably mounted rod having an offset central section that provides a movable cam contact surface to act on the top surface of the brush plate 148. Upon assembly, the strip brush 150 is located between the front wall of the housing 138 and the leading nozzle edge while the squeegee 152 is positioned between the trailing edge of the nozzle and the rear housing wall. The offset cam rod 156 includes an integral lever 158 that can be manipulated by a user to engage or retract the brush plate 148. It is contemplated that an assortment of cleaning heads can be used interchangeably with the cleaner body 12 previously disclosed. One suitable alternate comprises a vacuum cleaner head 14' with a hair collection assembly 160 as shown in FIGS. 8-10, and disclosed in pending U.S. patent application Ser. No. 11/683,744, which is incorporated herein by reference in its entirety. The '744 application discloses a vacuum cleaner head comprising a hair collection assembly 160 having a hair collection element 162 adapted to collect hair from a surface. The hair collection element can be mounted to the cleaning head 14' for movement between a use position in which the hair collection element is in contact with the surface to be cleaned (FIGS. 8 and 9) and a second position in which the hair collection element is spaced from the surface to be cleaned (FIG. 10) 138.

As indicated by the arrows in FIG. 4 and 5, the fan/motor assembly (not shown) is positioned downstream of the cyclone outlet 74. The fan/motor assembly draws air in through the cleaning head nozzle 140. Air passes through the articulating conduit 144, extension wand 16, and flexible hose 18. The working air containing debris is then drawn from the working air inlet pipe 60, through the inlet conduit 66, and into the separator inlet 70. Air enters the separation chamber 54 and swirls around the cylindrical wall 56 of the separation chamber 54. The upwardly ramped flange 82 directs the working air in a clockwise, helical fashion, flowing upwardly along the wall of the separation chamber. Dust and debris are separated from the air stream and exit the debris outlet 76 and into the dust collection chamber 58. The air then exits the separation chamber 54 through the exhaust grill apertures 78 where it passes through the cyclone outlet 74 and flows into the filter chamber 100. The air is directed along and through the filter media 110 by flow channels 104 formed by radial ribs 102 on the bottom side of the cyclone base 50. The filter assembly 52 traps any remaining fine dust entrained in the air stream. Upon exiting the filter assembly 52, the air flows through the access grill 40 formed in the back wall of the suction cavity 34 and into the motor cavity (not shown) where the air is ingested by the fan/motor assembly (not shown) and expelled through a motor exhaust aperture (not shown) at the back side of the cleaner body 12. During use, the user can selectively engage the brush assembly 142 by depressing the actuation lever 158. The lever 158 is formed integrally with the offset cam rod 156 and is configured to rotate the offset cam rod 156 between two positions. When the lever 158 is biased in a forward position, the cam rod 156 rotates the cam surface 157 away from the brush plate 148 and the coil springs 154 push the plate 148 to an upward position, thus retracting the brush assembly 142. When the lever 158 is biased toward a rearward position, the cam rod 156 rotates the cam surface 157 to contact the brush plate 148 and force it downward and, in so doing, thereby compressing the coil springs 154 and forcing the brush assembly 142 against the surface to be cleaned. As discussed previously, it is contemplated that a variety of commonly known cleaning head assemblies can be used interchangeably with the cleaner body 12, including those with pet hair collection members and/or rotating brush rolls mounted within the nozzle and the like.

While the invention has been specifically described in connection with certain specific embodiments thereof, it is to be understood that this is by way of illustration and not of limitation. It is anticipated that the features described can be applied to any cyclone separation device utilizing a single cyclone, or two or more cyclones arranged in any combination of series or parallel airflows. In addition, whereas the invention has been described with respect to a canister vacuum cleaner, the invention can also be used with other forms of vacuum cleaners, such as upright or central vacuum cleaners. Reasonable variation and modification are possible within the forgoing disclosure and drawings without departing from the spirit of the invention which is defined in the appended claims.

What is claimed is:

1. A vacuum cleaner comprising:
   a cleaner body having a suction cavity with an inlet port and an outlet port;
   a cyclone module removably mounted in the suction cavity and having:
   a separation chamber having an inlet opening at a lower portion thereof and adapted to communicate with the inlet port and an outlet opening at the lower portion and adapted to communicate with the outlet port;
   an exhaust grill mounted in the separation chamber and in fluid communication with the outlet opening;
   a ramp positioned adjacent the inlet opening and adapted to direct dirty air entering the inlet opening in an upward helical path along the separation chamber for separating dust or debris from air;
   a debris outlet comprising a guide member that extends horizontally from an upper portion of the separation chamber; and a dust collection chamber adjacent the separation chamber and in communication with the debris outlet for collecting debris and dust separated from air in the separation chamber; and a vacuum fan/motor mounted in the cleaner body downstream of the outlet opening and having a suction inlet in communication with the outlet opening and adapted to maintain a flow of dirty air from the inlet port through the separation chamber between the inlet opening and the outlet opening.

2. A vacuum cleaner according to claim 1 wherein the cyclone module includes a filter assembly fluidly connected to the outlet opening.

3. A vacuum cleaner according to claim 1 wherein the exhaust grill is removably mounted in the separation chamber above the outlet opening.

4. A vacuum cleaner according to claim 1 wherein a filter assembly is fluidly connected to the outlet opening.

5. A vacuum cleaner according to claim 1, wherein the exhaust grill comprises a closed upper end and an open lower end in fluid communication with the outlet opening.

6. A vacuum cleaner according to claim 1, wherein the cyclone module further comprises a lid positioned over at least the dust collection chamber and which mates with the guide member to form a debris guide channel that extends from the separation chamber into the dust collection chamber.

7. A vacuum cleaner according to claim 1 wherein the exhaust grill is removably mounted to the separation chamber above the outlet opening.

8. A vacuum cleaner according to claim 7 wherein a filter assembly is fluidly connected to the outlet opening.

9. A vacuum cleaner according to claim 7 wherein the cyclone module includes a filter assembly fluidly connected to the outlet opening.

10. A vacuum cleaner according to claim 9 wherein the filter assembly is removably mounted to the separation chamber.

11. A vacuum cleaner according to claim 10 wherein the cleaner body is a canister with an inlet port configured to sealingly receive a hose assembly.

12. A vacuum cleaner according to claim 9 wherein the filter assembly is removably mounted to the separation chamber.

13. A cyclone module for use in a vacuum cleaner having an inlet port and an outlet port, the cyclone module comprising:

a separation chamber having an inlet opening at a lower portion thereof and adapted to communicate with the inlet port and an outlet opening formed at the lower portion and adapted to communicate with the outlet port;

an exhaust grill mounted in the separation chamber and in fluid communication with the outlet opening;

a ramp positioned adjacent the inlet opening and adapted to direct dirty air entering the inlet opening in an upward helical path along the separation chamber for separating dust or debris from air;

a debris outlet comprising a guide member that extends horizontally from an upper portion of the separation chamber; and a dust collection chamber adjacent the separation chamber and in communication with the debris outlet for collecting debris and dust separated from air in the separation chamber.

14. A cyclone module according to claim 13, wherein the exhaust grill comprises a closed upper end and an open lower end in fluid communication with the outlet opening.

15. A cyclone module according to claim 13, further comprising a lid positioned over at least the dust collection chamber and which mates with the guide member to form a debris guide channel that extends from the separation chamber into the dust collection chamber.

* * * * *